United States Patent [19]

Mancini

[11] Patent Number: 5,003,258
[45] Date of Patent: Mar. 26, 1991

[54] POSITION TRANSDUCER WITH TEMPERATURE DEPENDENCY COMPENSATION HAVING A COIL AND DISPLACEABLE CORE MADE OF CONDUCTIVE AND FERROMAGNETIC MATERIALS

[75] Inventor: Nicolas Mancini, Villars-sur-Glâne, Switzerland

[73] Assignee: Vibro-Meter SA, Fribourg, Switzerland

[21] Appl. No.: 248,352

[22] Filed: Sep. 23, 1988

[30] Foreign Application Priority Data

Nov. 20, 1987 [CH] Switzerland ............. 4529/87

[51] Int. Cl.[5] ............. G01B 7/14; H01E 21/06
[52] U.S. Cl. ............. 324/207.12; 324/207.16; 336/45; 336/136
[58] Field of Search ............. 324/207, 208, 225, 233, 324/234, 236, 207.12, 207.15, 207.16, 207.17, 207.18, 207.19, 207.24; 336/130, 136, 45, 55; 340/870.31, 870.32, 870.35, 870.36

[56] References Cited

U.S. PATENT DOCUMENTS

| 2,141,890 | 12/1938 | Weis | 336/136 |
|---|---|---|---|
| 2,332,868 | 10/1943 | Nowak | 336/136 |
| 2,340,609 | 2/1944 | Mestas | 324/208 X |
| 3,381,217 | 4/1968 | Williamson et al. | 324/236 |
| 3,688,187 | 8/1972 | Loos | 324/234 X |
| 3,891,918 | 6/1975 | Ellis | 324/236 X |
| 4,502,006 | 2/1985 | Goodwin et al. | 324/208 |
| 4,623,840 | 11/1986 | Fujimura et al. | 324/208 |
| 4,667,158 | 5/1987 | Redlich | 324/207 |
| 4,704,578 | 11/1987 | Guillaumin | 324/225 |
| 4,717,874 | 1/1988 | Ichikawa et al. | 324/208 |
| 4,857,824 | 8/1989 | Tew | 336/136 |

FOREIGN PATENT DOCUMENTS

| 3109930 | 9/1982 | Fed. Rep. of Germany | 324/207.24 |
|---|---|---|---|
| 1558206 | 12/1979 | United Kingdom | 324/207.24 |

OTHER PUBLICATIONS

Roberts, Howard C., Electric Gaging Methods for Strain, Movement, Pressure and Vibration, *Instruments*, vol. 17, Jun. 1944, pp. 334–339.

*Primary Examiner*—Gerard R. Strecker
*Attorney, Agent, or Firm*—Marks Murase & White

[57] ABSTRACT

The transducer comprises only a simple coil in which a core normally connected to a device the position of which is to be measured is displaced axially. The core comprises a rod of ferromagnetic material surrounded by a tube of good electrical conductivity but of small magnetic permeability. The coil is supplied by an alternating current producing eddy currents in the tube. The drop of sensitivity due to the increase of the resistivity of the tube with the increase of the temperature is compensated by the increase of the sensitivity due to the increase of the permeability of the rod with the increase of the temperature. The transducer is of light weight and of small dimensions and it is compensated in temperature in the temperature range comprised between −40° C. and +20° C.

7 Claims, 1 Drawing Sheet

MEASURING CIRCUIT

POSITION TRANSDUCER WITH TEMPERATURE DEPENDENCY COMPENSATION HAVING A COIL AND DISPLACEABLE CORE MDE OF CONDUCTIVE AND FERROMAGNETIC MATERIALS

BACKGROUND OF THE INVENTION

The present invention relates to a position transducer comprising a coil supplied by a source of alternating current in which a core the position of which has to be measured is capable of being axially shifted.

Such a position transducer is described in U.S. Pat. No. 3,688,187. The measuring coil is connected in one of the branches of a measuring bridge, the other branches of which comprises resistances. For temperature compensating the transducer, a temperature dependent resistance is connected in one of the branches of the bridge. This resistance only provides a good compensation in a relatively limited temperature range but does not permit utilization of the transducer at high temperatures. U.S. Pat. No. 4,667,158 describes a position transducer which outputs on the principle of eddy currents, the coil being connected in one branch of a measuring bridge. Like the transducer in CH 509,373 the transducer can be temperature compensated only in a relatively limited range of temperatures and it is not foreseen for working at high temperatures.

Generally speaking, one compensates for temperature dependency of a transducer by a differential measurement of the variation of the impedance of the coil as a function of the position of the core inside of the coil. However, such a differential measurement necessitates a set of coils arranged axially side by side, the overall length being practically three times as great as the length of a single measuring coil used in a direct, non-differential measurement. It is clear that according to the application, it would be useful to reduce not only the space taken by the transducer but also its weight. This is more particularly the case in aeronautical applications where the transducer can be used e.g. for measuring the inclination of the blades which determine the orientation of the flow of air provided by a distributor to a turbine or for measuring the inclination of the flaps of the elevators. In the first application, measurement of the inclination of the blades, the transducer must operate at temperatures of up to +250° C. In the second application, the transducer must operate at an ambient temperature which may be as low as −40° C. Therefore, it would be useful to have a position transducer of light weight and small dimensions capable of operating between −40° C. and +250° C. with a good stability as a function of temperature and, does not require a differential arrangement in order to simplify the transducer and reduce the costs thereof.

SUMMARY OF THE INVENTION

Consequently, an object of the present invention is to provide a position transducer of light weight and small dimensions capable of operating in a broad range of temperatures, especially at high temperature said transducer being temperature compensated in the mentioned range of temperature.

To achieve this object a transducer according to the present invention uses a core which comprises a rod of a first material surrounded by a tube of a second material, the combination of the temperature dependency of determined parameters of said materials and the dimensioning of said core being such as to cancel with any drift in the sensitivity of the transducer as a function of the temperature in a given range of temperature.

The invention will be described further by means of the drawing of an example of execution.

DETAILED DESCRIPTION OF THE INVENTION

Figure 1:
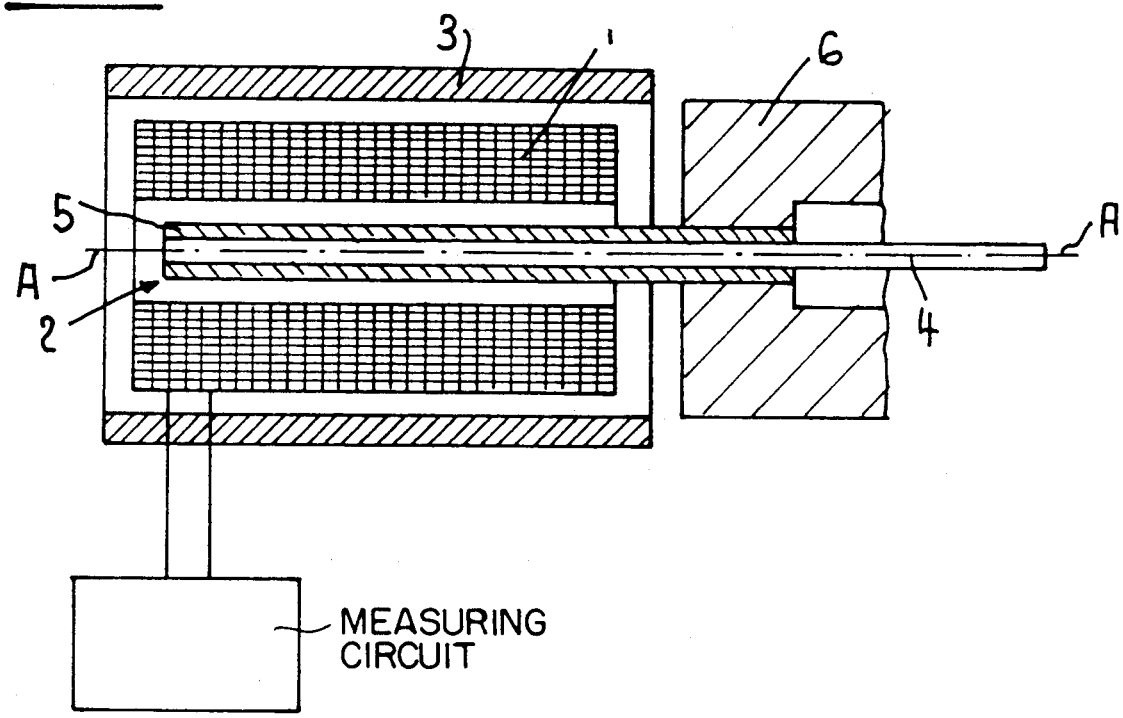
FIG. 1 is a schematic view of a longitudinal section through a transducer according to the present invention and FIG. 2 is a block-diagram of the electronic circuit connected to the transducer of FIG. 1.

FIG. 1 shows that a transducer according to the invention which may comprise a coil 1 the length of which along the longitudinal axis A—A is practically equal to the distance to be measured which is covered by the core 2 in the center of this coil. The coil 1 is protected from the external electromagnetic influences by a screen 3. FIG. 1 shows that the core 2 is in two pieces and that it comprises at the center a ferromagnetic rod 4 surrounded by a tube 5 having good electrical conductivity but a small magnetic permeability, e.g. a tube of aluminum or of copper or of any other adequate material. The rod 4 may be of iron or steel or of any other adequate ferromagnetic material. The tube 5 with the rod 4 is connected by a support 6 to the external device (not represented) the position of which is to be measured. The operation of the transducer is based on eddy currents which means that the coil is supplied by an alternating current which creates eddy currents by induction in a layer of small thickness at the external surface of the electrically conductive tube 5. The displacement of the core 2 in the coil 1 causes a variation of the impedance of the coil, due to the losses by eddy currents in this core.

Temperature compensation is obtained by the particular constitution of the core as explained below. An increase in ambient temperature causes a corresponding increase in the resistivity of the conductive tube 5. This increase in the resistivity causes a decrease in the eddy currents in the tube which leads to a drop of sensitivity. On the other hand, an increase in temperature causes a corresponding increase in the magnetic permeability of the ferromagnetic rod 4, this increase in the permeability causing an increase in the inductivity of the coil 1 and consequently an increase in the sensitivity. The preceding shows that changes in temperature effect the two elements of the core in opposite directions. Therefore, it is possible to compensate the transducer for variations in temperature by an adequate choice of the materials of the core and dimensions of the elements. The practice has shown that the drift as a function of temperature can be reduced in a range of temperature comprising between −40° C. and +250° C.

The preceding shows that the invention provides a position transducer which comprises a unique coil, the axial length of which is practically equal to the distance to be measured, so that the transducer is of simple construction, light weight and small dimensions. Moreover, due to the particular construction of the core, the transducer can operate between −40° C. and +250° C. without any substantial drift as a function of the temperature so that it can be used in an environment subjected to low as well as to high temperatures. The choice of materials of the core effects a reduction in the effects of temperature variations in the indicated range.

With respect to the treatment of the signal at the terminals of the coil 1, this signal being representative of the impedance of the coil and consequently of the position of the core in the latter, one can eliminate the effect of the temperature on the resistivity of the copper wire of the coil, if one measures the inductance of the coil i.e., the inductive component of the impedance of the coil, this parameter being essentially independent of or only weakly influenced by the temperature.

Figure 2:
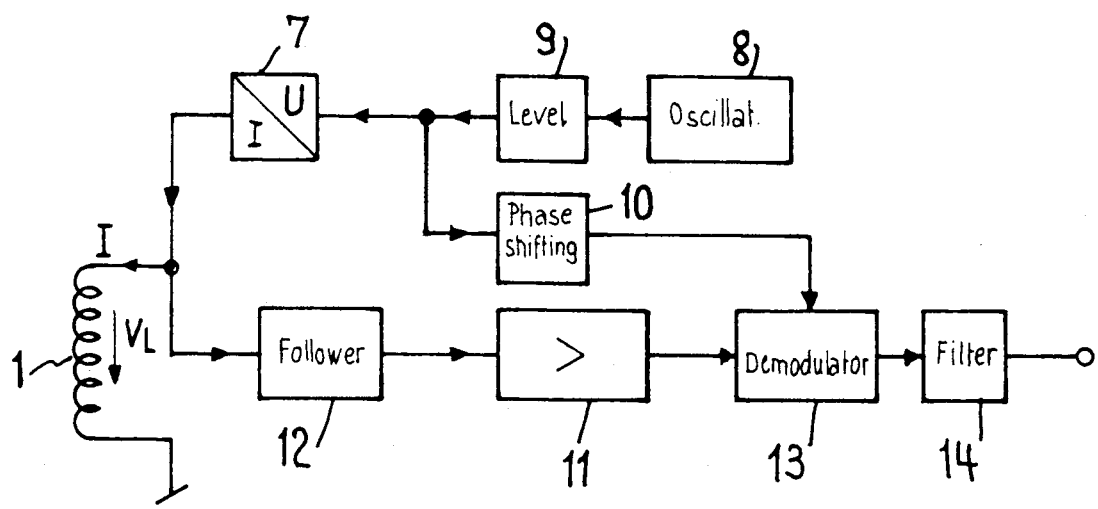

FIG. 2 shows a bloc-schematic of an electronic circuit for processing the voltage at the terminals of the coil 1 for eliminating the resistive component of this voltage and for creating an output signal which depends only on the inductive component of this voltage.

The coil 1 is supplied by a constant alternating current I delivered by a voltage/current converter 7 which receives the output signal of an oscillator 8 through a level adapter 9. The oscillator delivers e.g. a signal having a frequency of 10 kHz which is also the frequency of the current I. The adapter 9 delivers a reference signal to the converter 7 and to a phase shifting circuit 10.

The voltage $V_L$ at the terminals of the coil 1 is delivered through a follower 12 to an amplifier 11. The output of the amplifier 11 is connected to the input of a demodulator 13 which also receives the signal from the phase shifting circuit 10. The output of the demodulator 13 is connected to a low-pass filter 14 which delivers a continuous output signal having a value proportional to the position of the core 2 in the coil 1. The phase shifting circuit 10 produces an output signal the phase of which is shifted 90° with respect to the phase of the reference signal, this phase shifted signal controlling the demodulator 13 in such a way that the latter delivers a signal corresponding to the inductive component of the voltage $V_L$ at the terminals of the coil 1, this inductive component being phase shifted 90° with respect to the resistive component of this same voltage, this resistive component being in phase with the current I. This arrangement eliminates the influence of the resistive component, which is variable as a function of temperature, on the output signal of the electronic circuit of FIG. 2, specifically the output of the low-pass filter 14.

I claim:

1. A position transducer comprising a coil; a displaceable core positioned within said coil; a measuring circuit connected to said coil and including means for supplying an alternating current to said coil; and means for detecting an inductive component of the impedance of said coil, wherein said core comprises a rod of a first material and a tube of a second material surrounding said rod, one of said materials being a ferromagnetic material and the other of said materials having a high electric conductivity; wherein the rod and tube are connected to one another so as to be displaceable together relative to the coil; and said coil further comprising an impedance which varies as a function of the position of the core relative to the coil wherein said transducer exhibits a decrease in sensitivity corresponding to an increase in resistivity of said conductive material due to an increase in temperature; said decrease in sensitivity being compensated for by an increase in sensitivity due to an increase in permeability of said ferromagnetic material due to said increase in temperature.

2. The transducer according to claim 1, wherein the rod is made of said first material and the tube is made of said second material, said tube further having a low magnetic permeability.

3. The transducer according to claim 1 wherein the first material is selected from the group comprising iron and steel and the second material is selected from the group comprising aluminum and copper.

4. The transducer according to claim 1, wherein said means for supplying an alternating current supplies a constant level of current.

5. The transducer according to claim 1, wherein said measuring circuit further comprises a demodulator for producing an output signal level essentially dependent only on an inductive component of the coil voltage.

6. The transducer according to claim 5, wherein said measuring circuit further comprises a phase shifter connected to said alternating current supply means and wherein said demodulator receives a signal proportional to the coil voltage and a control signal from said phase shifter, said control signal being 90° out of phase with respect to the coil current.

7. The transducer according to claim 1, wherein the transducer is temperature compensated in a range of temperature comprised between about −40° C. and +250° C.

* * * * *

UNITED STATES PATENT AND TRADEMARK OFFICE
CERTIFICATE OF CORRECTION

PATENT NO. : 5,003,258
DATED : March 26, 1991
INVENTOR(S) : Nicolas Mancini

It is certified that error appears in the above-indentified patent and that said Letters Patent is hereby corrected as shown below:

On the title page, item [57] Abstract, line 15, "+20 °C" should read --+250 °C--.

Signed and Sealed this

Seventh Day of June, 1994

Attest:

BRUCE LEHMAN

*Attesting Officer*  *Commissioner of Patents and Trademarks*